(12) United States Patent
Ma et al.

(10) Patent No.: US 12,650,553 B2
(45) Date of Patent: Jun. 9, 2026

(54) BACKLIGHT MODULES AND DISPLAY DEVICE

(71) Applicant: Wuhu Tianma Automotive Electronics Co., Ltd., Wuhu (CN)

(72) Inventors: Jianhua Ma, Wuhu (CN); Yuling Wang, Wuhu (CN); Longwei Yang, Wuhu (CN); Chengjun Xue, Wuhu (CN); Jingyuan Wang, Wuhu (CN); Hui Yang, Wuhu (CN); Peng Zhang, Wuhu (CN); Xinyu Jiang, Wuhu (CN); Qiongqin Mao, Wuhu (CN); Yafei Lin, Wuhu (CN)

(73) Assignee: Wuhu Tianma Automotive Electronics Co., Ltd., Wuhan (CN)

( * ) Notice: Subject to any disclaimer, the term of this patent is extended or adjusted under 35 U.S.C. 154(b) by 0 days.

(21) Appl. No.: 19/082,236

(22) Filed: Mar. 18, 2025

(65) Prior Publication Data

US 2026/0147150 A1 May 28, 2026

(30) Foreign Application Priority Data

Nov. 27, 2024 (CN) .......................... 202411724838.5

(51) Int. Cl.
*F21V 8/00* (2006.01)
*G02F 1/1333* (2006.01)
(Continued)

(52) U.S. Cl.
CPC ......... *G02B 6/0091* (2013.01); *G02B 6/0023* (2013.01); *G02B 6/0088* (2013.01);
(Continued)

(58) Field of Classification Search
CPC .. G02B 6/0023; G02B 6/0088; G02B 6/0091; G02F 1/133314; G02F 1/133317; G02F 1/133328
See application file for complete search history.

(56) References Cited

U.S. PATENT DOCUMENTS

2006/0221641 A1* 10/2006 Yoon .................... G02B 6/0068
362/623
2010/0039579 A1* 2/2010 Park .................. G02F 1/133603
362/97.3
(Continued)

FOREIGN PATENT DOCUMENTS

CN 102003661 A * 4/2011 ....... G02F 1/133615
CN 104061495 A 9/2014
(Continued)

OTHER PUBLICATIONS

New Haven Display International, FFC Vs FPC: Understanding Flexible Cable Technologies, web page, Aug. 15, 2024, accessed Nov. 22, 2025, https://web.archive.org/web/20250815190818/https:// newhavendisplay.com/blog/ffc-vs-fpc-understanding-flexible-cable-technologies/ (Year: 2024).*
The First Office Action dated Aug. 11, 2025 for Chinese Application No. 202411724838.5 , 22 pages.

*Primary Examiner* — Keith G. Delahoussaye
(74) *Attorney, Agent, or Firm* — East IP P.C.

(57) ABSTRACT

The present application discloses a backlight module and display device. The backlight module includes a plate structure comprising a base plate and a side plate connected to the base plate, the base plate and the side plate surrounding an accommodating space, the base plate or the side plate comprising a first plate body provided with a first slot; an optical film disposed within the accommodating space; and a light-emitting assembly comprising a circuit board and a plurality of light-emitting elements electrically connected to the circuit board, each of the light-emitting elements being
(Continued)

at least partially disposed in a respective one of the first slots, and a light-emitting surface of each of the light-emitting elements facing the optical film, and the circuit board being located on a side of the first plate body facing away from the optical film.

16 Claims, 7 Drawing Sheets

(51) Int. Cl.
    *G02F 1/1335*        (2006.01)
    *G02F 1/13357*      (2006.01)

(52) U.S. Cl.
    CPC .. *G02F 1/133314* (2021.01); *G02F 1/133317* (2021.01); *G02F 1/133328* (2021.01); *G02F 1/133524* (2013.01); *G02F 1/133603* (2013.01); *G02F 1/133615* (2013.01)

(56)            References Cited

U.S. PATENT DOCUMENTS

| | | | | |
|---|---|---|---|---|
| 2013/0141670 A1* | 6/2013 | Yang | ................. | G02F 1/133608 |
| | | | | 362/609 |
| 2015/0362161 A1* | 12/2015 | Gao | .................... | G02B 6/0085 |
| | | | | 362/97.1 |
| 2024/0280243 A1* | 8/2024 | Kusunoki | ............. | F21V 7/0083 |

FOREIGN PATENT DOCUMENTS

| | | | | | |
|---|---|---|---|---|---|
| CN | 204116762 U | | 1/2015 | | |
| CN | 110109215 A | | 8/2019 | | |
| CN | 110308585 A | | 10/2019 | | |
| CN | 217007918 U | | 7/2022 | | |
| CN | 219872748 U | * | 10/2023 | | |
| KR | 20100129899 A | * | 12/2010 | .......... | G02F 1/1336 |
| KR | 20120045940 A | | 5/2012 | | |

\* cited by examiner

BACKLIGHT MODULES AND DISPLAY DEVICE

CROSS-REFERENCE TO RELATED APPLICATION

This application claims priority to Chinese Patent Application No. 202411724838.5, filed on Nov. 27, 2024, which is hereby incorporated by reference in its entirety.

TECHNICAL FIELD

The present application relates to the technical field of electronic products, and in particular to a backlight module and a display device.

BACKGROUND

The backlight module is one of the important components of the display device, which includes the display panel and the backlight module. The display panel itself cannot emit light, and the backlight module is required to provide a uniformly distributed surface light source to enable the display panel to display images normally. The display panel itself cannot emit light, and the backlight module is required to provide a uniformly distributed surface light source to enable the display panel to display images properly.

Therefore, a new backlight module and display device are urgently needed.

SUMMARY

Embodiments of the present application provide a backlight module and a display device, in which the light-emitting elements are disposed in a first slot of the first plate body to enable the light-emitting elements to utilize the space of the first slot to achieve a staggered stacking of the light-emitting element and the first plate body, to reduce the overall thickness of the backlight module in the case where the base plate includes the first plate body, or the width of the side bezel of the backlight module in the case where the side plate includes the first plate body, and to improve the use performance of the backlight module.

In one aspect, embodiments of the present application provide a backlight module including: a plate structure including a base plate and a side plate connected to the base plate, the base plate and the side plate surrounding an accommodating space, the base plate or the side plate including a first plate body, which is provided with a plurality of first slots; an optical film disposed within the accommodating space; and a light-emitting assembly including a circuit board and a plurality of light-emitting elements electrically connected to the circuit board, each of the light-emitting elements being at least partially disposed in a respective one of the first slots, and a light-emitting surface of each of the light-emitting elements facing the optical film, and the circuit board being located on a side of the first plate body facing away from the optical film.

In another aspect, embodiments of the present application provide a display device including: a display panel; and the above backlight module disposed on a backlight side of the display panel.

Compared to the related art, the backlight module provided in embodiments of the present application includes a plate structure, an optical film, and a light-emitting assembly. The plate structure includes a base plate and a side plate, the base plate or the side plate including a first plate body, which means that a portion of the base plate or the side plate serves as the first plate body. A first slot is formed in the first plate body to accommodate the light-emitting elements and expose the light-emitting elements, so that the light of the light-emitting element can be emitted to the optical film. The circuit board is located on the side of the first plate body facing away from the optical film, which is easy to install and set up. The light-emitting element is disposed in the first slot of the first plate body to enable the light-emitting elements to utilize the space of the first slot to realize the staggered stacking of the light-emitting elements and the first plate body, so as to reduce the overall boundary dimensions of the backlighting module. For example, the overall thickness of the backlight module can be reduced when the base plate includes the first plate body, or the width of the side border of the backlight module can be reduced when the side plate includes the first plate body, which improves the use performance of the backlight module.

BRIEF DESCRIPTION OF THE DRAWINGS

In order to more clearly illustrate the technical schemes of embodiments of the present application, a brief description will be given below with reference to the need to be used in the embodiments of the present application. It is obvious that the drawings described below are only some embodiments of the present application, and for a person skilled in the art, other drawings can be obtained according to these drawings without involving any inventive effort.

DETAILED DESCRIPTION

Features and exemplary embodiments of various aspects of the present application will be described in detail below. In the following detailed description, a number of specific details are presented in order to provide a full understanding of the present application. However, it will be apparent to those skilled in the art that the present application can be practiced without some of these specific details. The following description of embodiments is presented solely for the purpose of providing a better understanding of the present application by illustrating examples of the application.

It is to be noted that, in this document, relational terms such as first and second are used only to distinguish one entity or operation from another, and do not necessarily require or imply the existence of any such actual relationship or order between those entities or operations. Furthermore, the terms "including", "comprising", or any other variant thereof, are intended to cover non-exclusive inclusion, such that a process, method, article, or apparatus that includes a series of elements includes not only those elements, but also other elements not expressly listed, or elements inherent to such process, method, article, or apparatus. Without further limitation, the fact that an element is defined by the phrase "including . . . " does not preclude the existence of additional identical elements in the process, method, article or apparatus in which the element is included.

In related art, the backlight module includes a light-emitting assembly to serve as a light source, and the light-emitting assembly is usually fixed within the plate structure, and this fixation will result in a higher concentration of internal heat, and at the same time, taking into account the optical distance of the light-entry side, the thickness of the circuit board, and the thickness of the plate structure, the overall boundary size is restricted, and requirements for the narrow bezel cannot be further realized, affecting the use performance of the backlight module.

In order to solve the above problem, in embodiments of the present application, the light-emitting element is disposed in the first slot of the first plate body to enable the light-emitting element to utilize the space of the first slot to realize the staggered stacking of the light-emitting element and the first plate body, reducing the overall boundary size of the backlight module and improving the usability of the backlight module.

For a better understanding of the present application, the backlight module and display device according to an embodiment of the present application are described in detail below in connection with FIGS. 1 to 18.

Figure 1:
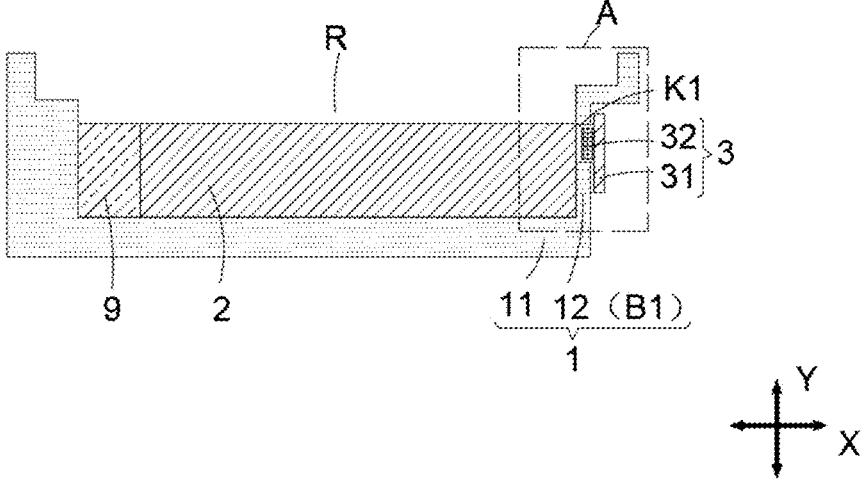
FIG. 1 is a schematic view of a backlight module according to an embodiment of the present application.
Figure 2:
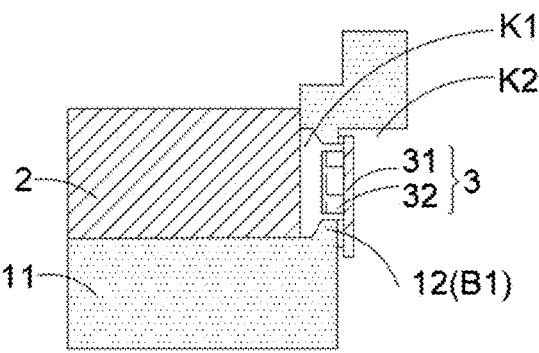
FIG. 2 is a partially enlarged view of Part A of FIG. 1 according to an embodiment of the present application.

Referring to FIGS. 1 to 2, FIG. 1 is a schematic view of a backlight module according to an embodiment of the present application; FIG. 2 is a partially enlarged view of Part A of FIG. 1 according to an embodiment of the present application.

Embodiments of the present application provides a backlight module including: a plate structure 1 including a base plate 11 and a side plate 12 connected to the base plate 11, the base plate 11 and the side plate 12 enclosing a accommodating space R, the base plate 11 or the side plate 12 including a first plate body B1, which is provided with a plurality of first slots K1; an optical film 2 disposed within the accommodating space R; a light-emitting assembly 3 including a circuit board 31 and a plurality of light-emitting elements 32 electrically connected to the circuit board 31, each of the light-emitting elements 32 being at least partially disposed in a respective one of the first slots K1, and a light-emitting surface of the light-emitting elements 32 facing the optical film 2, and the circuit board 31 being located on a side of the first plate body B1 facing away from the optical film 2.

The backlight module provided in embodiments of the present application includes a plate structure 1, an optical film 2, and a light-emitting assembly 3. The plate structure 1 includes a base plate 11 and a side plate 12, the base plate 11 or the side plate 12 including a first plate body B1, which means that a portion of the base plate 11 or the side plate 12 serves as the first plate body B1. A first slot K1 is formed in the first plate body B1 to accommodate the light-emitting elements 32 and expose the light-emitting elements 32, so that the light of the light-emitting element 32 can be emitted to the optical film 2. The circuit board 31 is located on the side of the first plate body B1 facing away from the optical film 2, which is easy to install and set up. The light-emitting element 32 is disposed in the first slot K1 of the first plate body B1 to enable the light-emitting element 32 to utilize the space of the first slot K1 to realize the staggered stacking of the light-emitting element 32 and the first plate body B1, so as to reduce the overall boundary dimensions of the backlighting module. For example, the overall thickness of the backlight module can be reduced when the base plate 11 includes the first plate body B1, or the width of the side border of the backlight module can be reduced when the side plate 12 includes the first plate body B1, which improves the usability of the backlight module.

Moreover, in embodiments of the present application, the first slot K1 is provided on the first plate body B1, which means that removes a partial material of the first plate body B1, so as to reduce the overall weight of the backlight module, facilitate the installation and use of the backlight module, and facilitate the maintenance of the backlight module.

In related art, the light-emitting assembly 3 is generally provided inside the plate structure 1, and due to the internal closure, the overall heat is easy to accumulate inside, and when the circuit board 31 and other components in the light-emitting assembly 3 are damaged, it is necessary to disassemble them starting from the display panel P to which the backlight module is applied, with a high risk of scrapping and difficulty in reworking. However, in the embodiments of the present application, the light-emitting element 32 is disposed in the first slot K1 of the first plate body B1, and the circuit board 31 is located on the side of the first plate body B1 facing away from the optical film 2, that is, on the outside of the plate structure 1, so that it is possible to realize the maintenance or replacement of the circuit board 31 without disassembling the display panel P. At the same time, it is possible to further increase the heat dissipation effect and reduce the damage rate of the light-emitting assembly 3.

In this embodiment, the plate body structure 1 may be of one-piece structure to facilitate molding, and the one-piece structure has a higher structural strength, so that when the first slot K1 is disposed in the first plate body B1, it will not have too much impact on the overall structure of the plate body structure 1, ensuring the reliability of the use of the backlight module. For example, the plate body structure 1 may be integrally molded using a die-casting process, that is, the base plate 11 and the side plate 12 are connected as a whole, or the plate body structure 1 may be prepared and molded using a process such as stamping.

The accommodating space R surrounded by the base plate 11 may be a semi-open accommodating space R so as to facilitate setting a membrane layer component such as the optical film 2 in the accommodating space R.

Optionally, the optical film 2 refers to a film layer or film layers that optically adjust(s) the light emitted from the light-emitting element 32, and the optical film 2 may include a layer or layers of films with different functions according to different actual structural functions of the backlight module. For example, the optical film 2 may include at least one of a translucency-enhancing layer, a light-guiding plate, or other film layers.

In some optional embodiments, the optical film 2 includes a light guide plate, and the light-emitting element 32 is disposed between the light guide plate and the circuit board 31.

Among them, the light guide plate (LGP) is made from optical grade acrylic or PC sheet, and a plurality of light guide points are formed on the bottom surface of the plate through laser engraving, V-shaped cross grid engraving or UV screen-printing technology. These light guides allow light to be diffused at all angles as they enter the plate, and the light comes out evenly from the front side of the light guide through reflection and refraction. The design of the light guide allows the light to be reflected and refracted several times inside the plate, ultimately achieving a uniform luminous effect.

In this embodiment, the light-emitting element 32 is located between the light guide plate and the circuit board 31 so that the light emitted from the light-emitting element 32 can directly enter the light guide plate, be reflected and refracted inside the light guide plate, and ultimately be emitted uniformly.

Optionally, when the optical film 2 includes a light guide plate, the side plate 12 includes a first plate body B1, the light-emitting element 32 is correspondingly disposed in the first slot K1 of the side plate 12, and the light emitted from the light-emitting element 32 enters the side of the light guide plate and exits from the front side which intersects the side of the light guide plate. The extending direction of the front side of the light guide plate may be parallel to the extending direction of the base plate 11.

It should be noted that the light-emitting element 32 may specifically be an LED (Light Emitting Diode), specifically a conventional LED with a size greater than 200 μm, or a smaller Micro LED (Micro Light Emitting Diode) or Mini LED (Mini Light Emitting Diode), to reduce costs and facilitate installation.

Referring to FIGS. 1 to 2, in some optional embodiments, the side plate 12 includes a first plate body B1; the side plate 12 is disposed on the side of the optical film 2 along a first direction X, the first direction X intersecting the thickness direction Y of the optical film 2.

It is to be understood that, in this embodiment, the side plate 12 includes a first plate body B1, and the light-emitting assembly 3 is also provided on the side plate 12, and the light emitted from the light-emitting assembly 3 irradiates on the side of the optical film 2 along the first direction X, forming a side-emitting structured form. Optionally, the first direction X may be perpendicular to the thickness direction Y of the optical film 2.

Figure 3:
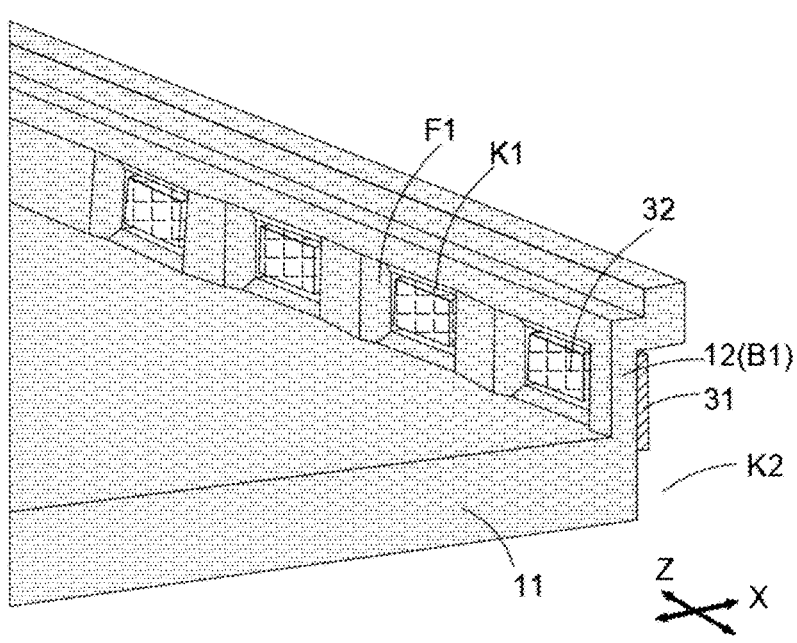
FIG. 3 is a schematic view of a light-emitting assembly according to an embodiment of the present application.

Referring to FIG. 3, FIG. 3 is a schematic view of a light-emitting assembly 3 according to an embodiment of the present application; optionally, the first slots K1 and the light-emitting elements 32 are all sequentially arranged along the second direction Z, and the second direction Z intersects the first direction X and the thickness direction Y of the optical film 2. Optionally, the second direction Z and the first direction X are perpendicular to each other, and the second direction Z and the thickness direction Y of the optical film 2 are perpendicular to each other.

It is to be understood that a plurality of light-emitting elements 32 may be provided, and a plurality of first slots K1 are arranged sequentially along the second direction Z for accommodating the light-emitting elements 32 accordingly, considering that the irradiation range of the light emitted from a single light-emitting element 32 is relatively small, and the luminance is not sufficient to satisfy the demand. In this embodiment, the second direction Z may be the extending direction of the side plate 12, so as to facilitate the setting of the first slots K1.

Referring to FIG. 3, optionally, the first slots K1 are evenly spaced along the second direction Z, that is, the spacing between adjacent two of the first slots K1 is equal, so as to ensure the uniformity of the light emitted from the light-emitting element 32.

Optionally, the light-emitting elements 32 and the first slots K1 are provided in one-to-one correspondence.

It is considered that the optical film 2 needs to be sufficiently limited to avoid vibration abrasion when the backlight module is applied in a mobile device such as a vehicle.

Figure 4:
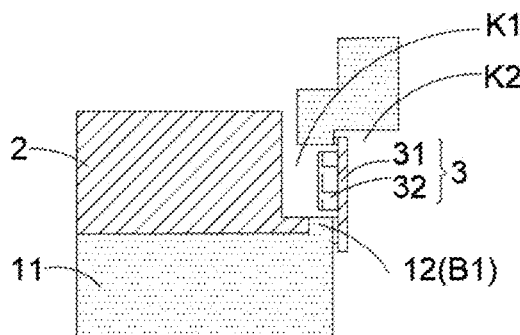
FIG. 4 is a partially enlarged view of Part A of FIG. 1 according to another embodiment of the present application.

Referring to FIG. 4, FIG. 4 is a partially enlarged view of Part A of FIG. 1 according to another embodiment of the present application; in some optional embodiments, the optical film 2 at least partially abuts against the first plate body B1 along the first direction X.

In this embodiment, the interaction force between the first plate body B1 and the optical film 2 is utilized in order to fix the optical film 2, avoiding movement of the optical film 2 which otherwise causes abrasion of the optical film 2. Moreover, in this embodiment, the first slot K1 is formed in the side plate 12, and the circuit board 31 is disposed on the side of the side plate 12 facing away from the optical film 2, that is, the optical film 2 will not directly abut against the circuit board 31, avoiding the problem of the circuit board 31 being injured by the optical film 2.

Optionally, a portion of the optical film 2 disposed on the side of the light-emitting element 32 facing the base plate 11 projects in the direction where the side plate 12 is located to abut against the side plate 12 along the thickness direction of the optical film 2, which ensures the stability of the abutting while not affecting the light emission of the light-emitting element 32.

Referring to FIG. 1, optionally, a limit block 9 is provided on the side of the optical film 2 facing away from the light-emitting element 32, and the optical film 2 is disposed between the limit block 9 and the side plate 12 to realize limit and fixation for the optical film 2 in the direction perpendicular to the thickness direction of the optical film 2.

Figure 5:
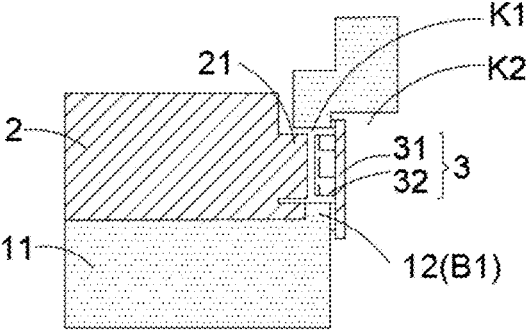
FIG. 5 is a partially enlarged view of Part A of FIG. 1 according to yet another embodiment of the present application.

Referring to FIG. 5, FIG. 5 is a partially enlarged view of Part A of FIG. 1 according to yet another embodiment of the present application. Optionally, the optical film 2 includes an extending portion 21 that extends into the first slot K1 to make the optical film 2 closer to the light-emitting element 32, so that the light emitted from the light-emitting element 32 enters the optical film 2 as much as possible uniformly to avoid irradiating on the film layer other than the optical film 2, and improve the utilization rate of the light emission.

Figure 6:
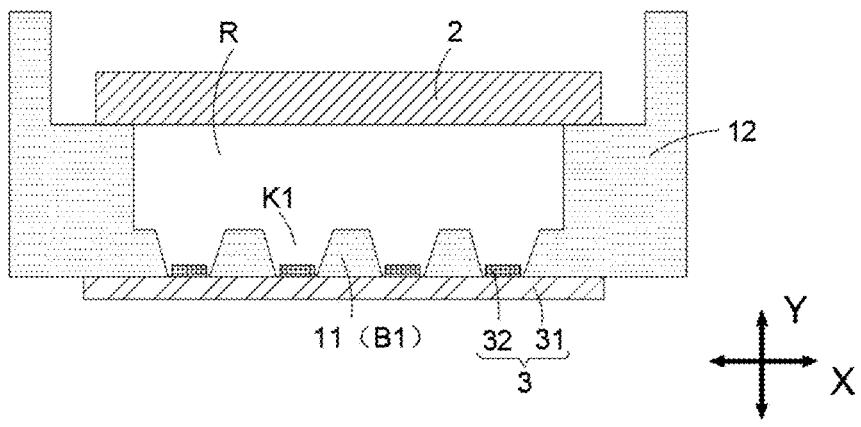
FIG. 6 is a schematic view of a backlight module according to another embodiment of the present application.
Figure 7:
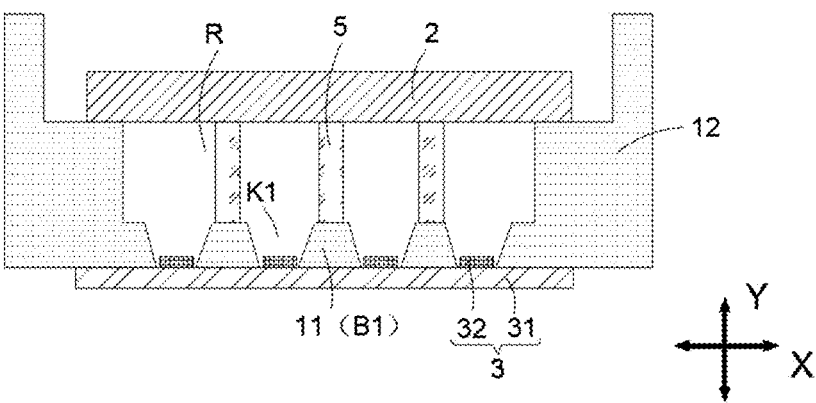
FIG. 7 is a schematic view of a backlight module according to yet another embodiment of the present application.
Figure 8:
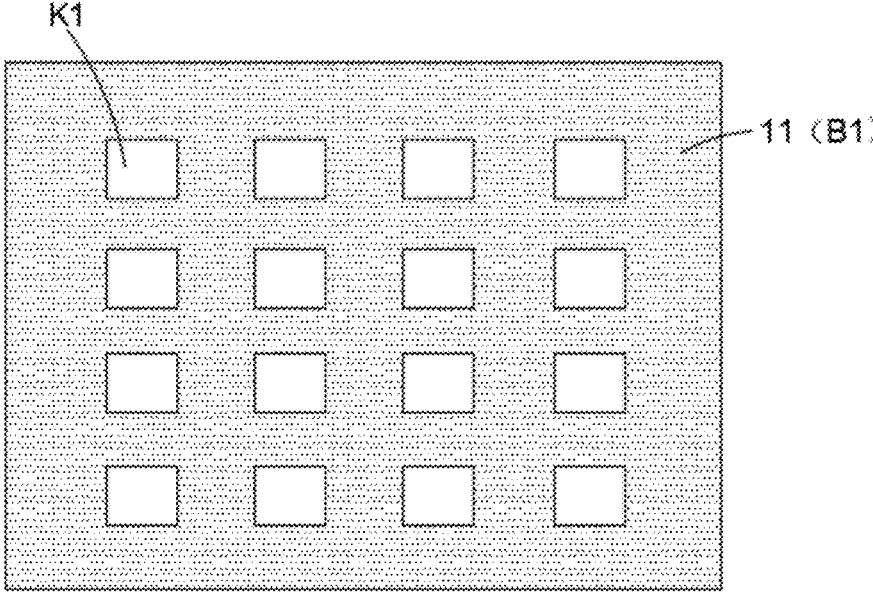
FIG. 8 is a schematic view of a base plate according to an embodiment of the present application.

Referring to FIGS. 6 to 8, FIG. 6 is a schematic view of a backlight module according to another embodiment of the present application; FIG. 7 is a schematic view of a backlight module according to yet another embodiment of the present application; FIG. 8 is a schematic view of a base plate 11 according to an embodiment of the present application; in some optional embodiments, the base plate 11 includes a first plate body B1; in the thickness direction Y along the optical film 2, the base plate 11 is disposed on a side of the optical film 2.

In this embodiment, the light-emitting element 32 is correspondingly disposed in the first slot K1 of the base plate 11, and the circuit board 31 is fixed to the side of the base plate 11 facing away from the optical film 2, that is, the backlighting module adopts a bottom-emitting structural form.

It is considered that after partially hollowing out the base plate 11 to form the first slot K1, the change in the structural strength of the base plate 11 may affect the support effect of the plate structure 1 on the optical film 2, resulting in a risk of the optical film 2 collapsing down.

Referring to FIG. 7, in order to avoid the above problem, in some optional embodiments, the backlight module further includes a support structure 5, which is disposed on the side surface of the base plate 11 facing the optical film 2, and abuts against the optical film 2.

In this embodiment, one end of the support structure 5 is connected to the side surface of the base plate 11 facing the optical film 2 to realize the fixation of the support structure, and the other end of the support structure 5 abuts against the optical film 2 to realize the additional support for the optical film 2, preventing the optical film 2 from collapsing in the direction where the base plate 11 is located, and improving the stability of the optical film 2.

Optionally, the support structure 5 may be in the form of a support block, a cylindrical support column or other structural forms, and the support structure and the base plate 11 may be a split structure, and the support structure may be connected to the base plate 11 by means of an adhesive layer or the like; alternatively, the support structure and the base plate 11 may be a one-piece structure, i.e., the support structure and the base plate 11 are molded integrally in order to improve the stability of the connection between the support structure and the base plate 11.

Figure 19:
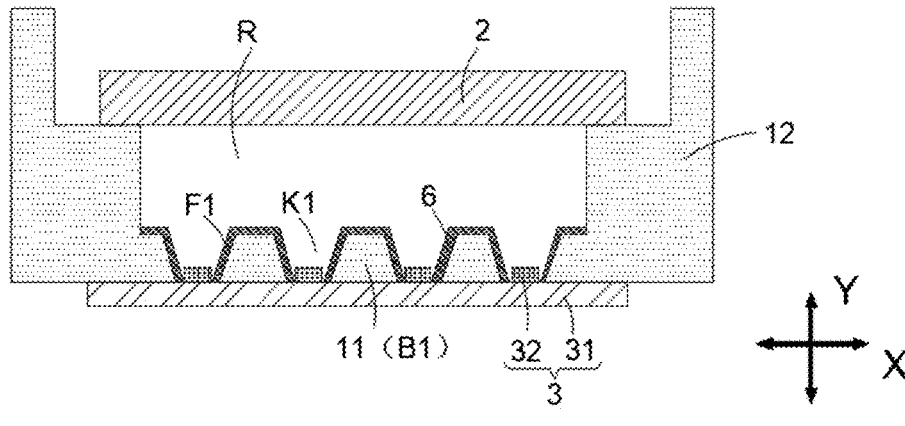
FIG. 19 is a schematic view of a backlight module according to even still yet another embodiment of the present application.

Referring to FIG. 19, FIG. 19 is a schematic view of a backlight module according to even still yet another embodiment of the present application; in some optional embodiments, the first plate body B1 includes a first surface F1 that forms the first slot K1, and a reflective layer 6 is provided on the first surface F1.

It is understood that since the light-emitting element 32 is provided in the first slot K1, part of the light emitted from the light-emitting element 32 will irradiate on the first surface F1. In the embodiments of present embodiment, the reflective layer 6 is disposed on the first surface F1 to reflect the light emitted from the light-emitting element 32 that irradiates on the reflective layer 6, and the reflected light can be directed back to the optical film 2, so as to avoid that the light emitted from the light-emitting element 32 onto the first surface F1 is absorbed by the first surface F1, and to improve the utilization efficiency of the light emitted from the light-emitting element 32.

Optionally, the reflective layer 6 includes a white ink. It can be understood that the white ink has a weak absorption capacity for light and a high reflectivity, realizing the role of reflecting the light source and adjusting the light pattern. At the same time, it can avoid the heat generated by the light emitting from light-emitting element 32 from accumulating on the first surface F1, which indirectly reduces the heat of the light-emitting element 32 and improves the service life of the light-emitting element 32.

Referring to FIG. 2, FIG. 6, or FIG. 7, in some optional embodiments, the cross-sectional shape of the first slot K1 is at least partially tapered along the direction pointing from the optical film 2 to the light-emitting element 32.

It is to be noted that the cross-sectional shape of the first slot K1 is at least partially tapered means that the cross-sectional shape of the first slot K1 may be fully tapered, that is, the opening of the first slot K1 is gradually reduced, or the opening of the first slot K1 is gradually increased in the light emission direction of the light-emitting element 32 emits, so as to serve to expand the light emission range, or the opening of the first slot K1 may be partially tapered in the direction in which the optical film 2 points toward the light-emitting elements 32, and another part of the opening of the first slot K1 may remain unchanged, forming a shape similar to a horn.

In the prior art, limited by the structure of the backlight module, the light-emitting angle of the light-emitting element 32 cannot be controlled, and part of the large-angle light source is directly emitted on the end surface of the diaphragm other than the optical film 2 and cannot all enter the optical film 2, resulting in a waste of the light source, and also resulting in the bright lines at the edges under the display screen.

Figure 9:
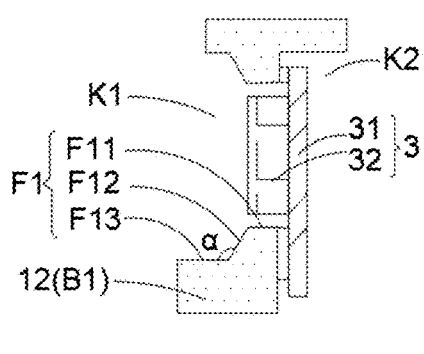
FIG. 9 is a partially enlarged view of Part A of FIG. 1 according to still yet another embodiment of the present application.

Referring to FIG. 9, FIG. 9 is a partially enlarged view of Part A of FIG. 1 according to still yet another embodiment of the present application; optionally, in order to avoid the above mentioned problem, the first plate body B1 includes a first surface F1 where the first slot K1 is formed, and along a first direction X, the first surface F1 includes a first portion F11, a second portion F12, and a third portion F13 connected in sequence, the first portion F11, the third portion F13 extending in the same direction, the second portion F12 being inclined with respect to the first portion F11 in a direction facing away from the light-emitting element 32; the light-emitting element 32 being located in part of the first slot K1 that is formed with the first portion F11.

It can be understood that, in this embodiment, the second portion F12 is inclined with respect to the first portion F11 in a direction facing away from the light-emitting element 32, so that the light emitted from the light-emitting element 32 is reflected on the second portion F12 to achieve an effect of expanding the light emission range. The extending directions of the first portion F11 and the third portion F13 are the same, and the first portion F11 and the third portion F13 can be used to limit the light emitted from the light-emitting element 32, so as to limit the light emission angle of the light-emitting element 32, so that the light emitted from the light-emitting element 32 can irradiate the optical film 2 as much as possible, so as to improve the light emission efficiency and avoid the problem of edge bright lines of the display device.

Optionally, the extending directions of the first portion F11 and the third portion F13 may intersect the thickness direction Y of the optical film 2. For example, the extending directions of the first portion F11 and the third portion F13 may be perpendicular to the thickness direction Y of the optical film 2.

In this embodiment, the second portion F12 is inclined in a direction facing away from the light-emitting element 32 with respect to the first portion F11, and the angle of inclination of the second portion F12 with respect to the direction facing away from the light-emitting element 32 with respect to the first portion F11 directly affects the final emission position of the light-emitting element 32 on the first surface F1.

The inventor found that the angle α between the extending direction of the second portion F12 and the extending direction of the third portion F13 can be greater than or equal to 120° and less than 180°. The angle α between the extending direction of the second portion F12 and the extending direction of the third portion F13 should not be too small, otherwise it will cause the light emission range of the light-emitting element 32 to be too small to meet the demand; the extending direction of the second portion F12 and the extending direction of the third portion F13 should not be too large, otherwise it will cause the light emitted from the light-emitting element 32 to irradiate on other film layers outside the optical film 2, resulting in light loss. The angle α between the extending direction of the second portion F12 and the extending direction of the third portion F13 may be greater or equal to any one of 120°, 130°, 140°, 150°, 160°, 170°, 180°.

Figure 10:
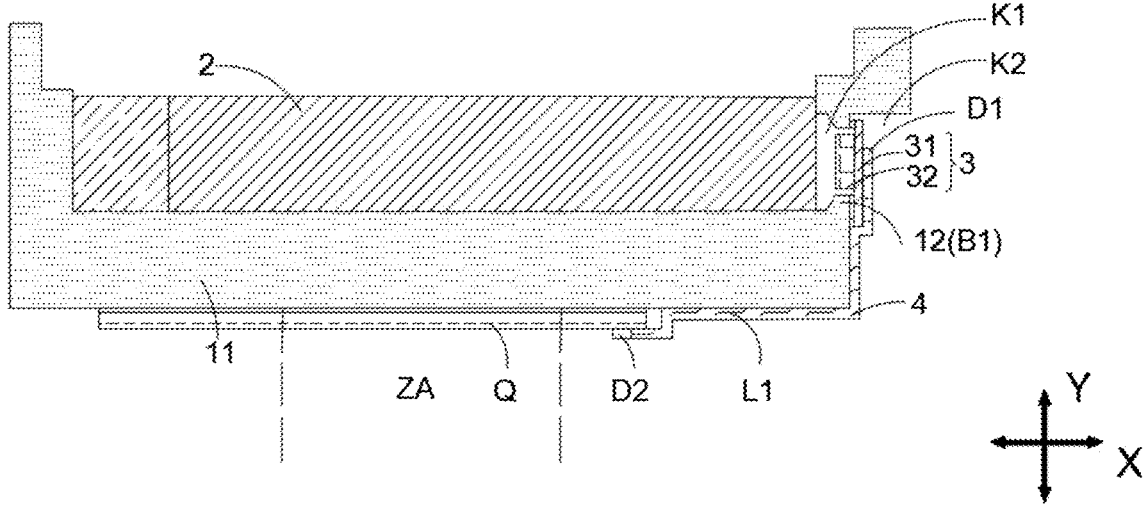
FIG. 10 is a partially enlarged view of Part A of FIG. 1 according to even still yet another embodiment of the present application.
Figure 11:
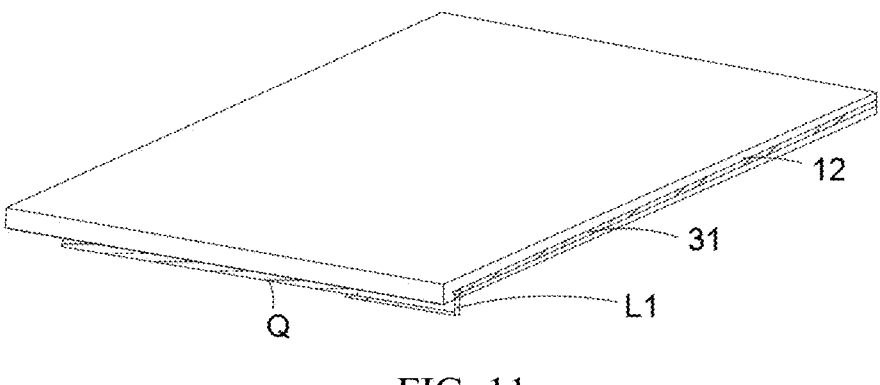
FIG. 11 is a schematic view of a circuit board according to an embodiment of the present application.
Figure 12:
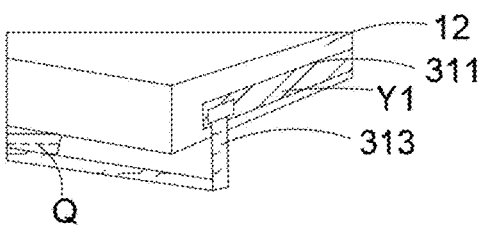
FIG. 12 is a partial schematic view of a circuit board according to an embodiment of the present application.
Figure 13:
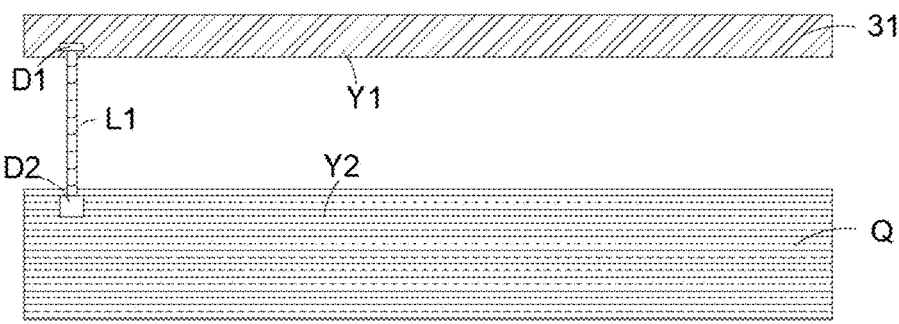
FIG. 13 is a schematic view of a circuit board according to another embodiment of the present application.
Figure 14:
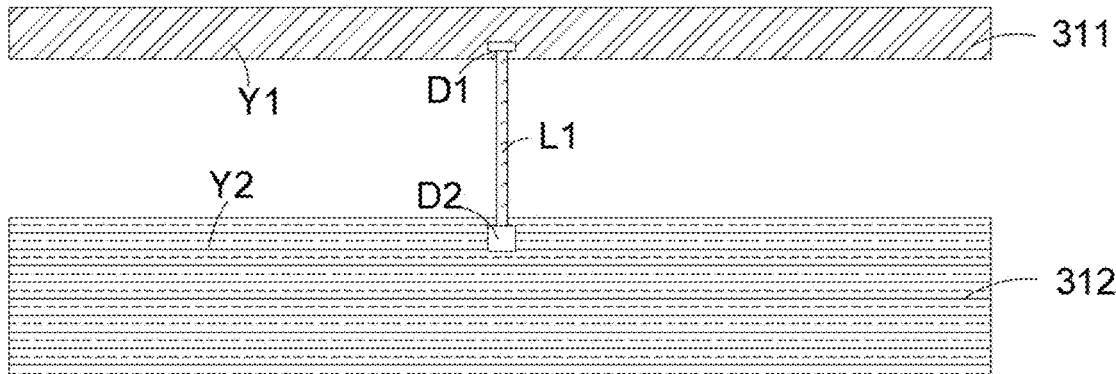
FIG. 14 is a schematic view of a circuit board according to yet another embodiment of the present application.

Referring to FIGS. 10 to 14, FIG. 10 is a partially enlarged view of Part A of FIG. 1 according to even still yet another embodiment of the present application; FIG. 11 is a schematic view of a circuit board 31 according to an embodiment of the present application; FIG. 12 is a partial schematic view of a circuit board 31 according to an embodiment of the present application; FIG. 13 is a schematic view of a circuit board 31 according to another embodiment of the present application; FIG. 14 is a schematic view of a circuit board 31 according to yet another embodiment of the present application.

In some optional embodiments, the circuit board 31 includes a printed circuit board or a flexible circuit board, that is, the circuit board 31 may be FPC (Flexible Printed Circuit Board) or PCB (Printed Circuit Board).

Flexible circuit boards are better bendable and easier to connect compared to the printed circuit boards.

Optionally, the circuit board 31 may be an FR-4 epoxy resin board to reduce cost.

Referring to FIGS. 10 to 14, FIG. 10 is a partially enlarged view of Part A of FIG. 1 according to even still yet another embodiment of the present application; FIG. 11 is a schematic view of a circuit board according to an embodiment of the present application; FIG. 12 is a partial schematic view of a circuit board according to an embodiment of the present application; FIG. 13 is a schematic view of a circuit board 31 according to another embodiment of the present application; FIG. 14 is a schematic view of a circuit board 31 according to yet another embodiment of the present application.

Optionally, the backlight module also includes a driver board Q, which is disposed on the side of the base plate 11 facing away from the optical film 2; the circuit board 31 includes a printed circuit board, which is electrically connected to the driver board Q via the first connector D1, the flexible circuit board L1, and the second connector D2 in sequence, the first connector D1 being disposed on the printed circuit board, and the second connector D2 being disposed on the driver board Q.

It is to be understood that the printed circuit board cannot be directly electrically connected to the driver board Q by bending itself due to its poor bendability, and thus, the first connector D1, the flexible circuit board L1, and the second connector D2 need to be provided for electrically connecting the printed circuit board to the driver board Q. Specifically, the printed circuit board is electrically connected to the flexible circuit board L1 via the first connector D1, and the flexible circuit board L1 is electrically connected to the driver board Q via the second connector D2.

The driver board Q may include driver circuit to drive the light-emitting element.

Referring to FIGS. 13 to 14, optionally, the circuit board 31 includes a first edge Y1, the first connector D1 being disposed in the middle of the first edge Y1. The driver board Q includes a second edge Y2, the second connector D2 being disposed in the middle of the second edge Y2.

The shape and cutting layout of circuit boards in existing technology are limited. Generally, L-shaped or straight structured circuit boards are considered, and the output terminals are generally disposed on both sides of circuit board 31. However, in this embodiment, the circuit board 31 is a printed circuit board, which is connected to drive board Q in conjunction with the first connector D1, the flexible circuit board L1, and the second connector D2. The positions of first connector D1 and second connector D2 can be flexibly set according to actual needs, which is the connection positions of the flexible circuit board L1, the printed circuit board, and the drive board Q, to flexibly adapt to the wiring design of circuit board 31.

It should be noted that the middle of the first edge Y1 or the middle of the second edge Y2 in this embodiment does not refer specifically to the center of the first edge Y1 or the center of the second edge Y2, but may also be a region of the first edge Y1 close to the center, or a region of the second edge Y2 close to the center.

Considering that the circuit board 31 in this embodiment is disposed outside the first plate body B1, and can provide a larger space for setting, and thus it is possible to transfer some of the backlight driving circuits and components on the driver board Q to the back side of the circuit board 31, so as to reduce the space requirement of the PCB SMD (Surface Mounted Devices) of the driver board Q for the hitches.

Referring to FIG. 10, in some optional embodiments, a first adhesive layer J is provided between the circuit board 31 and the first plate body B1, that is, the circuit board 31 is connected to the first plate body B1 via utilizing the adhesion of the first adhesive layer J to secure the circuit board 31 to the first plate body B1.

Optionally, the first adhesive layer J includes a thermal conductive adhesive, which can play the role of heat conduction and heat dissipation while realizing fixation.

Alternatively, the circuit board 31 and the first plate body B1 may be connected in other ways. For example, the circuit board 31 and the first plate body B1 are connected to each other by bolts, which improves the stability of the fixation, reduces the risk of warping defects of the circuit board 31, and improves the ESD resistance and rework of the circuit board 31, and the bolts only need be unscrewed from the outside without affecting the bonding of the display panel P. It should be noted that as long as the fixing method that can fix the circuit board 31 to the first plate body B1 and does not affect the thickness of the backlight module or the width of the bezel can be applied to the present application, and there is no special limitation.

Referring to FIGS. 2 to 5, and FIGS. 9 to 10, in some optional embodiments, the first plate body B1 further includes a second slot K2 that communicates with a first slot K1, and the circuit board 31 is at least partially located in the second slot K2, that is, the circuit board 31 may also occupy the original space of the first plate body B1 in order to avoid increasing the width of the bezel, a portion of the first plate body B1 is hollowed out in order to form the second slot K2 to accommodate the circuit board 31.

Optionally, in the direction perpendicular to the thickness of the first plate body B1, the depth of the second slot K2 is greater than or equal to the thickness of the circuit board 31, so that the circuit board 31 as a whole can be provided in the second slot K2 to improve the space utilization.

Optionally, the side plate 12 includes a first plate body B1 provided with a second slot K2 as described above.

Figure 15:
FIG. 15 is a schematic view of a light-emitting assembly according to another embodiment of the present application.

Referring to FIG. 15, which is a schematic view of a light-emitting assembly 3 according to another embodiment of the present application, in some optional embodiments, the light-emitting assembly 3 further includes a control element 33, which comprises a first control element 331 disposed on the same side of the circuit board 31 as the light-emitting element 32.

In this embodiment, the first control element 331 can specifically use components such as an IC chip to realize controlling for the light-emitting element 32. In this embodiment, the utilization of space on this side of the circuit board 31 is improved by setting the light-emitting element 32 and the first control element 331, and since the first control element 331 is not provided on the other side surface of the circuit board 31, the other side surface of the circuit board 31 has space for setting other film layers such as the heat dissipation layer 4 to improve the heat dissipation efficiency of the circuit board 31.

Figure 16:
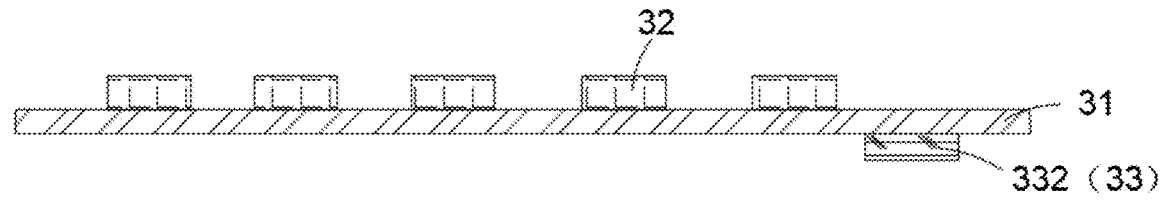
FIG. 16 is a schematic view of a light-emitting assembly according to yet another embodiment of the present application.

Referring to FIG. 16, which is a schematic view of a light-emitting assembly 3 according to yet another embodiment of the present application; in another embodiment, the control element 33 includes a second control element 332 that is disposed on a different side of the circuit board 31 from the light-emitting element 32, and it can be appreciated that, when the circuit board 31 is disposed in the second slot K2, the second control element 332 that is disposed on the side surface of the circuit board 31 facing away from the light-emitting element 332 may also be disposed in the second slot K2 to further reduce the width of the bezel.

Figure 17:
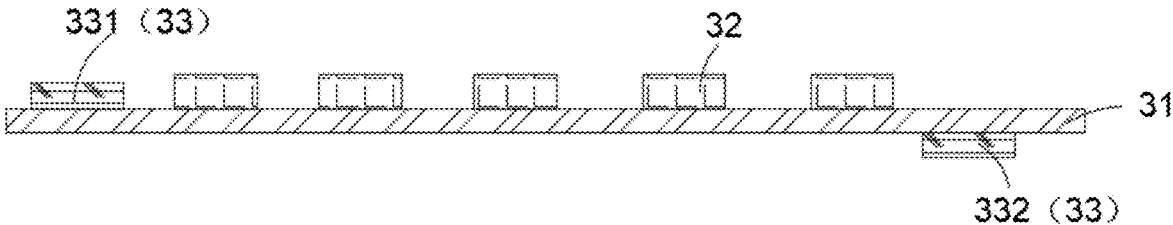
FIG. 17 is a schematic view of a light-emitting assembly according to still yet another embodiment of the present application.

It is to be noted that one of the above-mentioned first control element 331 and the second control element 332 may be provided, or both the first control element 331 and the second control element 332 may be provided, as shown in FIG. 17, which is a schematic view of a light-emitting assembly 3 according to still yet another embodiment of the present application, which may be selected according to the actual need without any special limitation.

Referring to FIGS. 15 and 16, in some optional embodiments, the light-emitting assembly 3 includes at least two circuit boards 31 and at least one circuit board 31 is provided with a first control element 331 and at least one circuit board 31 is provided with a second control element 332.

It should be noted that different circuit boards 31 can be used to drive the light-emitting elements 32 located at different positions and in different areas, and the specific number of circuit boards 31 needs to be selected according to the specific number of light-emitting elements 32 to be set up, and there is no special limitation. And in different circuit boards 31, the control elements 33 at different positions may be used to realize different effects. For example, the light-emitting assembly 3 includes two circuit boards 31 provided along the second direction Z, corresponding to the light-emitting elements 32 lined up along the second direction Z and located at different positions. One of circuit boards 31 may be provided with a first control element 331, that is, the first control element 331 and the circuit board 31 are located on the same side of the circuit board 31, and the other circuit board 31 may be provided with a second control element 332, that is, the second control element 332 and the circuit board 31 are located on different sides of the circuit board 31.

It should be noted that in this embodiment, since the circuit board 31 is disposed on the side of the light-emitting element 32 facing away from the first plate body B1, that is, the circuit board 31 is exposed, so that the circuit board 31 can be directly contacted with the air outside of the plate structure 1. The heat transfer path is reduced, the total thermal impedance of the heat transfer model is reduced, and the heat dissipation efficiency is improved in this embodiment, compared to the prior art in which the circuit board 31 is disposed in the plate structure 1.

Figure 18:
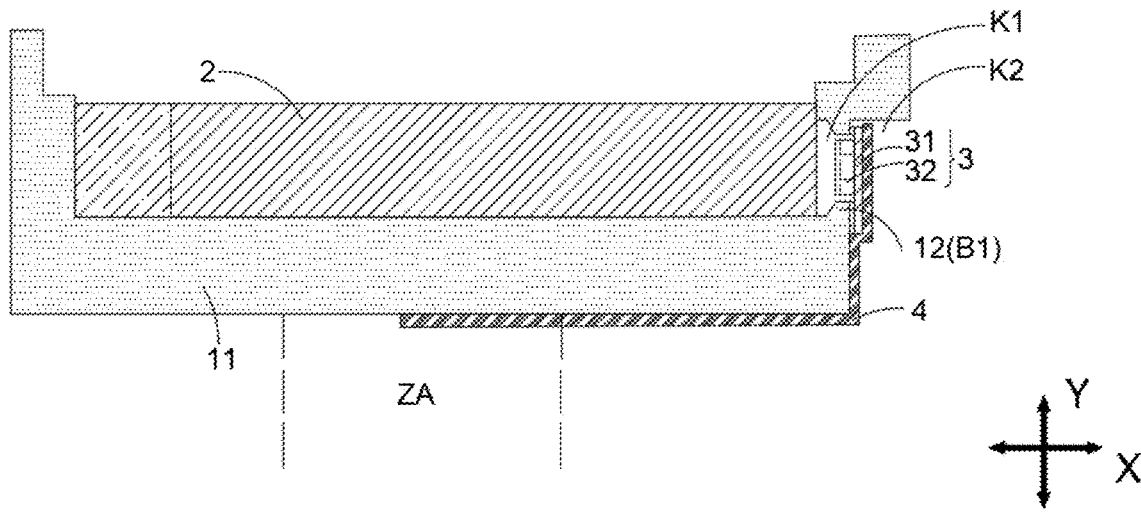
FIG. 18 is a schematic view of a backlight module according to still yet another embodiment of the present application.

Refer to FIG. 18, which is a schematic view of the backlight module according to still yet another embodiment of the present application. Considering that in practical cases, there is no forced convection of the outside air (generally without active heat dissipation), and the heat will still accumulate at the circuit board 31, in order to further enhance the heat transfer capability, in some optional embodiments, the backlight module further includes a heat dissipation layer 4 disposed on a side of the circuit board 31 facing away from the light-emitting element 32.

It is understood that the thermal conductivity of the material used in the heat dissipation layer 4 is higher compared to that of the circuit board 31 to enable the heat dissipation layer 4 to emit the heat of the circuit board 31 to the air more quickly, avoiding the accumulation of heat at the circuit board 31, and ensuring the service life of the circuit board 31 as well as the stability of the use of the circuit board 31.

Optionally, the heat dissipation layer 4 may be in the form of a heat dissipation tape to facilitate bonding to the surface of the side of the circuit board 31 facing away from the light-emitting element 32, and the heat dissipation tape may be prepared using an adhesive material such as an acrylic pressure sensitive adhesive.

Referring to FIG. 18, in some optional embodiments, the side surface of the plate structure 1 facing away from the optical film 2 includes a center zone ZA along the thickness direction Y of the optical film 2, and the heat dissipation layer 4 extends to the center zone ZA.

It is to be noted that, in this embodiment, when the side plate 12 includes the first plate body B1, the heat dissipation layer 4 may extend to the base plate 11 along the side plate 12 facing away from the side of the optical film 2, that is, the end surface of the plate structure 1 facing away from the side of the optical film 2 is the lower surface of the base plate 11, the heat dissipation layer 4 extends to the center zone ZA of the bottom surface of the base plate 11 along the thickness direction Y of the optical film 2, and transmits heat to the backlight module at an external central position, increasing the heat dissipation area, and thus improving the heat dissipation efficiency.

Optionally, the circuit board 31 includes an aluminum substrate, and the circuit board 31 is prepared by using an aluminum material with better thermal conductivity to further improve the heat dissipation efficiency of the circuit board 31 and avoid heat accumulation.

Figure 20:
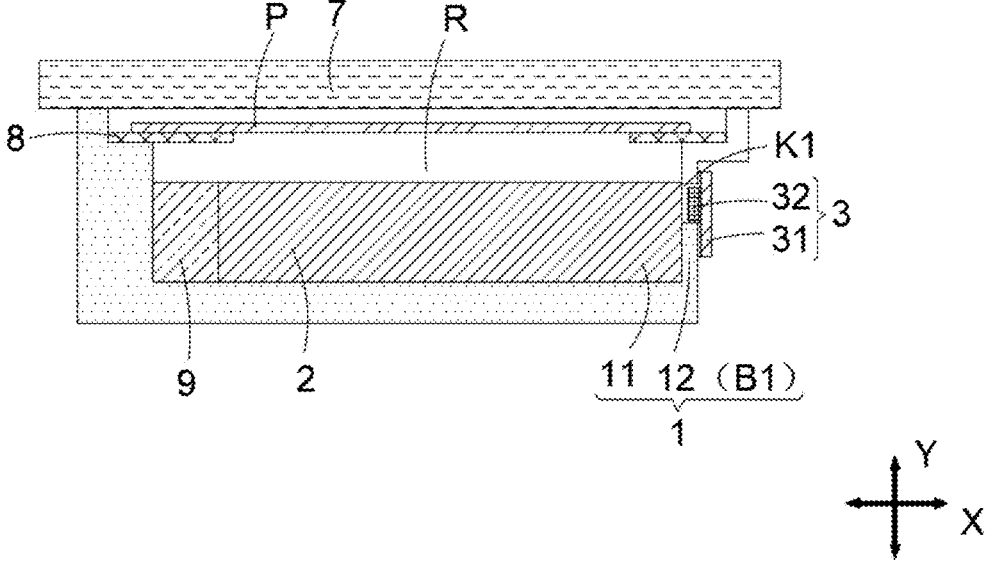
FIG. 20 is a schematic view of a display device according to an embodiment of the present application.
Figure 21:
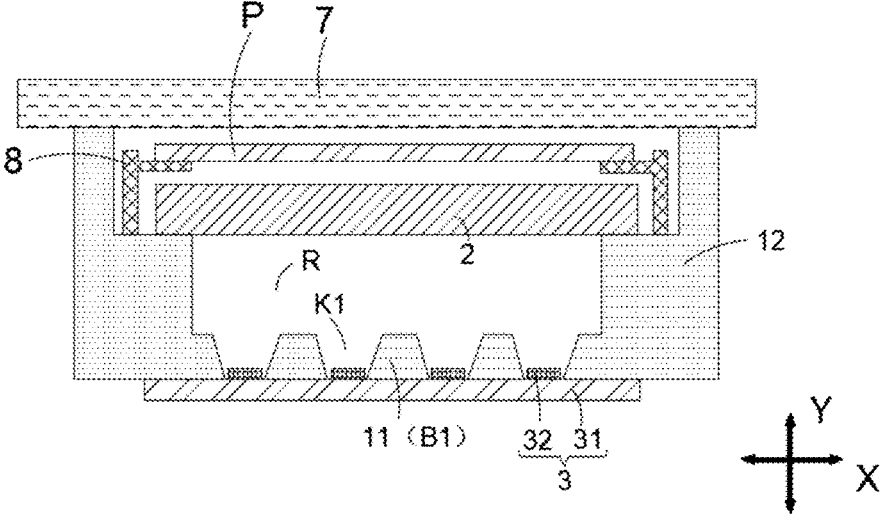
FIG. 21 is a schematic view of a display device according to another embodiment of the present application.

Referring to FIG. 20 or FIG. 21, an embodiment of the present application further provides a display device including: a display panel P; a backlight module disposed on a backlight side of the display panel P, the backlight module being a backlight module in any of the above embodiments.

Optionally, the display device further includes a shading layer 8 disposed on the side of the optical film 2 facing away from the base plate 11, which is used to shield the edges of the optical film 2 to avoid the problem of bright lines at the edges. The light-shading layer 8 may be connected to the side plate 12. Optionally, the width of the light-shading layer 8 along the first direction X may be 3 mm to 4 mm, for example, 3 mm, the thickness of the light-shading layer 8 may be 0.1 to 0.3 mm, for example, the thickness of the light-shading layer 8 may be 0.2 mm, and the material of the light-shading layer 8 may be made of a material such as PET (Polyethylene terephthalate, polyethylene terephthalate).

Optionally, the display panel P is located on the side of the light-shading layer 8 facing away from the base plate 11.

Optionally, a cover 7 is provided on the opening of the accommodating space R of the frame structure, the cover 7 being supported and fixed by side plates 12.

The display device provided in the embodiments of the present application has the technical effect of the technical solution of the backlight module in any of the above embodiments, and the same or corresponding structures as the above embodiments as well as the explanations of the terms are not repeated herein.

The backlight module in this embodiment is used to provide light to the display panel P to enable the display panel P to realize light emission and display, and the display panel P may be an LCD (Liquid Crystal Display) panel.

The display device provided by the embodiments of the present application can be applied to a cellular phone, or any electronic product with a display function, including, but not limited to, the following categories: televisions, laptop computers, desktop monitors, tablet computers, digital cameras, smart bracelets, smart glasses, in-vehicle displays, medical devices, industrial control devices, touch interaction terminals, and the like, and the embodiments of the present application do not make any special limitations thereon.

The above is only specific embodiments of the present application, and it can be clearly understood by a person skilled in the field to which it belongs that for the sake of convenience and brevity of description, the specific working processes of the above-described systems, modules and units can be known by referring to those described in the foregoing embodiments of the method and will not be repeated herein. It should be understood that the scope of protection of the present application is not limited thereto, and any person skilled in the art may readily think of various equivalent modifications or substitutions within the scope of the technology disclosed in the present application which shall be covered by the scope of protection of the present application.

It is also to be noted that the exemplary embodiments mentioned in the present application describe some methods or systems based on a series of steps or means. However, the present application is not limited to the order of the steps mentioned above, that is, the steps may be performed in the order mentioned in the embodiments, or in a different order from in embodiments, or several steps may be performed simultaneously.

What is claimed is:

1. A backlight module comprising:
a plate structure comprising a base plate and a side plate connected to the base plate, the base plate and the side plate surrounding an accommodating space, the base plate or the side plate comprising a first plate body provided with a plurality of first slots;
an optical film disposed within the accommodating space; and
a light-emitting assembly comprising a circuit board and a plurality of light-emitting elements electrically connected to the circuit board, each of the light-emitting elements being at least partially disposed in a respective one of the first slots, and a light-emitting surface of each of the light-emitting elements facing the optical film, and the circuit board being located on a side of the first plate body facing away from the optical film,
wherein a cross-sectional shape of the first slot forms a shape similar to a horn, in which the cross-sectional shape of at least a part of the first slot is tapered along a direction pointing from the optical film to the light-emitting elements, and the cross-sectional shape of another part of the first slot remains unchanged, and
wherein the side plate comprises the first plate body disposed on a side of the optical film along a first direction, the first direction intersecting a thickness direction of the optical film.

2. The backlight module according to claim 1, wherein the first slots and the light-emitting elements are sequentially arranged along a second direction that intersects the first direction and the thickness direction of the optical film.

3. The backlight module according to claim 1, wherein the optical film at least partially abuts against the first plate body along the first direction.

4. The backlight module according to claim 1, wherein the first plate body comprises a first surface where the first slots are formed, the first surface comprising a first portion, a second portion, and a third portion that are connected in sequence along the first direction, the first portion, the third portion extending in a same direction, the second portion being inclined with respect to the first portion in a direction facing away from the light-emitting element;
the light-emitting element is located in part of the first slot that is formed with the first portion.

5. The backlight module according to claim 4, wherein an angle between an extending direction of the second portion and an extending direction of the third portion is greater than or equal to 120° and less than 180°.

6. The backlight module according to claim 1, wherein the circuit board comprises a printed circuit board or a flexible circuit board.

7. The backlight module according to claim 6, further comprising a driver board disposed on a side of the base plate facing away from the optical film,
wherein the circuit board comprises a printed circuit board, which is electrically connected to the driver board via a first connector, a flexible circuit board, and a second connector in sequence, the first connector being disposed on the printed circuit board, and the second connector being disposed on the driver board.

8. The backlight module according to claim 7, wherein the circuit board comprises a first edge, the first connector being disposed in a middle of the first edge; and
the driver board comprises a second edge, the second connector being disposed in a middle of the second edge.

9. The backlight module according to claim 1, wherein the light-emitting assembly further comprises a control element, which comprises a first control element disposed on a same side of the circuit board as the light-emitting element, or which comprises a second control element disposed on a different side of the circuit board from the light-emitting element.

10. The backlight module according to claim 9, wherein the light-emitting assembly comprises the circuit boards in a number of at least two, at least one of the circuit boards being provided with the first control element, and at least one of the circuit boards being provided with the second control element.

11. The backlight module according to claim 1, further comprising a heat dissipation layer disposed on a side of the circuit board facing away from the light-emitting elements.

12. The backlight module according to claim 11, wherein a side surface of the plate structure facing away from the optical film comprises a center zone along the thickness direction of the optical film, and the heat dissipation layer extends to the center zone.

13. The backlight module according to claim 1, wherein the first plate body further comprises a second slot that communicates with the first slots, and the circuit board is at least partially located in the second slot.

14. The backlight module according to claim 1, wherein the first plate body comprises a first surface that forms the first slot, and a reflective layer is provided on the first surface.

15. The backlight module according to claim 1, wherein a first adhesive layer is disposed between the circuit board and the first plate body; or the circuit board and the first plate body are connected to each other by bolts.

16. A display device, comprising:
a display panel; and
a backlight module disposed on a backlight side of the display panel, wherein the backlight module comprises:
a plate structure comprising a base plate and a side plate connected to the base plate, the base plate and the side plate surrounding an accommodating space, the base plate or the side plate comprising a first plate body provided with a plurality of first slots;
an optical film disposed within the accommodating space; and
a light-emitting assembly comprising a circuit board and a plurality of light-emitting elements electrically connected to the circuit board, each of the light-emitting elements being at least partially disposed in a respective one of the first slots, and a light-emitting surface of each of the light-emitting elements facing the optical film, and the circuit board being located on a side of the first plate body facing away from the optical films,
wherein across-sectional shape of the first slot forms a shape similar to a horn, in which the cross-sectional shape of at least a part of the first slot is tapered along a direction pointing from the optical film to the light-emitting elements, and the cross-sectional shape of another part of the first slot remains unchanged, and
wherein the side plate comprises the first plate body disposed on a side of the optical film along a first direction, the first direction intersecting a thickness direction of the optical film.

* * * * *